April 11, 1944. W. E. O'SHEI 2,346,502
FLUID PRESSURE MOTOR
Filed April 5, 1943 2 Sheets-Sheet 1
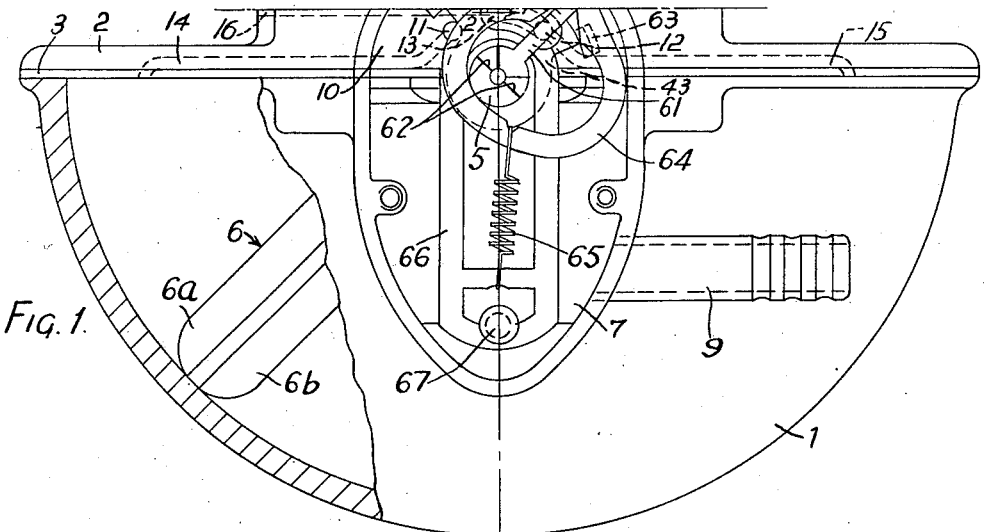
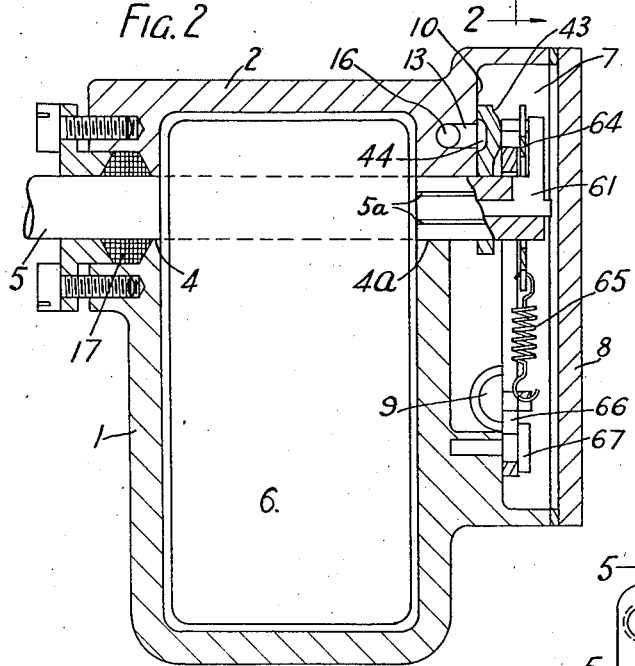
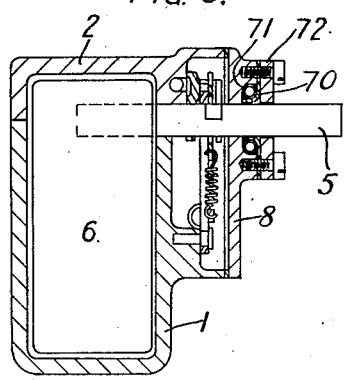
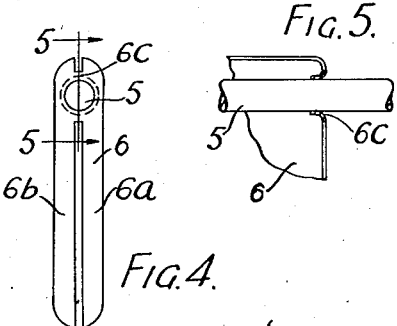
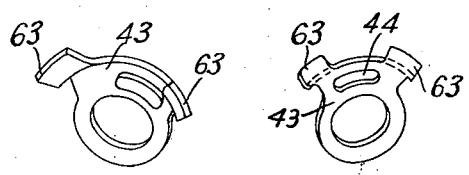
INVENTOR
William Edward O'Shei.
BY
Bean, Brooks, Buckley & Bean
ATTORNEYS.

April 11, 1944.  W. E. O'SHEI  2,346,502
FLUID PRESSURE MOTOR
Filed April 5, 1943  2 Sheets-Sheet 2
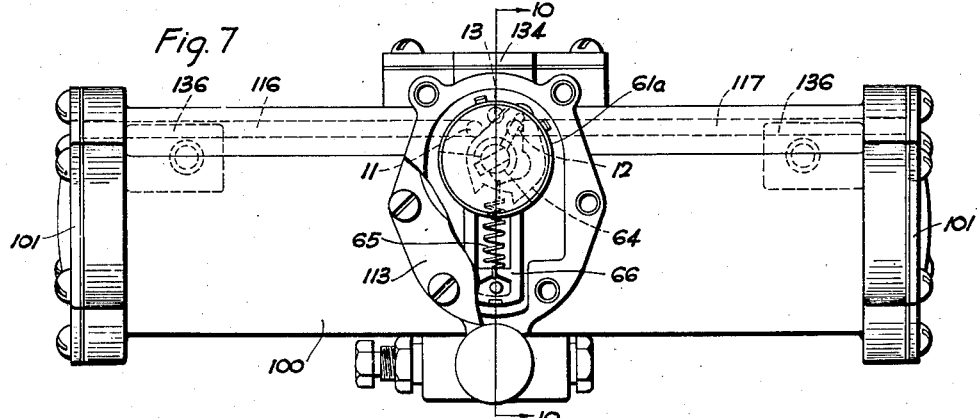
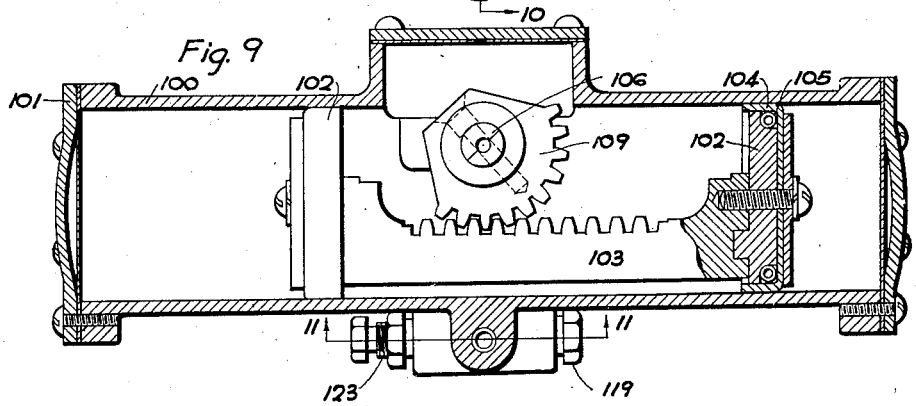
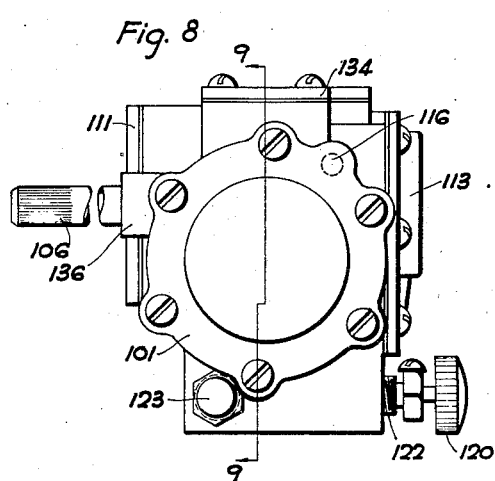
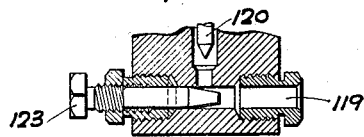
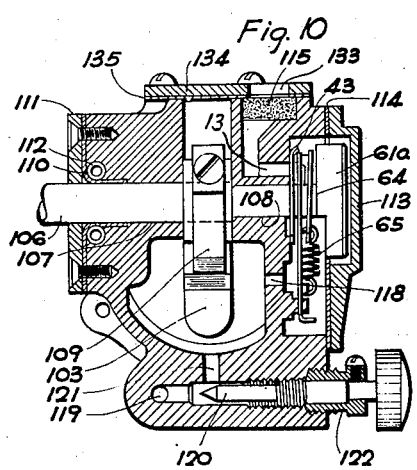
INVENTOR
William Edward O'Shei
BY
Beau, Brooks, Buckley & Beau.
ATTORNEYS Patented Apr. 11, 1944

2,346,502

UNITED STATES PATENT OFFICE 2,346,502

FLUID PRESSURE MOTOR

William Edward O'Shei, London, England

Application April 5, 1943, Serial No. 481,843
In Great Britain March 31, 1942

8 Claims. (Cl. 121—97)

The present invention relates to fluid pressure motors which are particularly suitable for operating windscreen wipers. The present invention has for its object to provide a motor which can be operated by fluid pressures above atmospheric pressure, such as by compressed air, and which can be simply manufactured by mass production methods.

In compressed air motors as hitherto constructed any air which leaks past the piston packing can flow to atmosphere. Such leakage together with any leakage from the cover or covers sealing the piston chamber have to be made good by air supplied through the ports and passages, and since these are restricted in order that the motor shall not run at too high a speed, such leakages can considerably affect the operating efficiency of the motor. Although the motor may have no substantial leaks when originally constructed, the leak may develop during use and this is particularly possible with windscreen wiper motors which often remain unused for long periods of time. If the motor should be stopped for some time the piston leathers may become "set" in a position causing them to leak when the motor is restarted and the piston moves to a different position in the cylinder where the dimensions may be slightly different. The condensation in the compressed air line forms an emulsion with the oil in the motor to form a sticky mass which hardens the piston leathers to such an extent that the pressure exerted by the spring expanders generally provided is not sufficient to overcome the "set" taken up by the leathers.

The present invention has for its object to reduce or eliminate the effect of such leakage past the piston by supplying compressed fluid directly to a space between two interconnected piston elements so that the compressed fluid in this space acts as a kind of piston packing between the two outer surfaces of the piston elements, any leakage past either piston element then being taken care of by the fluid flowing directly to the space between the piston elements and not having to be replaced by fluid flowing through the restricted ports and passages. When cupped piston leathers are employed they are arranged with the cupped portions facing each other so that the fluid pressure is retained between them and acts as an expander for the leathers, and since the pressure between the piston elements is the full fluid line pressure it is sufficient to expand the leathers to overcome any "set" which they may have taken up. Further, since the compressed fluid in the space between the piston elements is not exhausted whilst the motor is in operation the piston leathers are always expanded as a result of which the motor reverses more rapidly.

Further, in order to obtain satisfactory operation in fluid motors it is important that the valve controlling the flow of fluid pressure to opposite ends of the motor cylinder should operate with a snap action so that when the piston approaches the end of its travel the valve is snapped over quickly and the motor reversed. The snap-over action of the valve mechanism is necessary since otherwise the valve, particularly when the motor is running very slowly, might stop in the dead centre position with both the inlet and exhaust valves open at the same time which would allow the fluid pressure to flow right through to the exhaust without operating the motor. In motors operated by compressed air it has been the general practice to employ balls or mushroom type valves with springs for changing the position of the valves with a snap action as the piston approaches the end of its stroke. Difficulties are experienced, however, due to the variations of air pressure which are likely to be experienced with compressed air motors, an increase in the air pressure often preventing the valve from snapping over due to the increased pressure on the surface of the valve overcoming the spring tension. If the spring tension is increased to overcome this tendency, the valve snaps over with a much stronger action thereby exerting more wear on the parts and giving rise to the possibility of breakage unless the valve parts are made extremely strong and heavy, which is a disadvantage where the motor has to be fitted to an aircraft where weight considerations are important. Furthermore, if the air pressure falls to a low value it may be insufficient to move the strong spring to change over the valve mechanism.

These difficulties are particularly important with windscreen wiper motors which have to be fitted on vehicles on which the air pressure may vary over a considerable range, for example when the motor is driven from a compressed air supply on the vehicle which is also used for operating other mechanism, for example the vehicle brakes. In windscreen wiper motors, also, the friction of the blade moving over the windscreen exerts a braking action on the motor spindle, and the consequent slowing down of the motor results in a building up of the pressure on the valves which tends to make them "stick" and not change over at the end of a piston stroke.

The employment of a slide valve, for example a rotary or semi-rotary valve, overcomes some of these difficulties but the employment of such a valve presents difficulties in preventing leakage past the spindle which actuates the valve mechanism, which mechanism is generally directly driven by the motor piston or paddle.

By means of the present invention, however, a slide valve may be readily employed by arranging the shaft which actuates the valve mechanism to extend into or through the space between the two interconnected piston elements, since in this case any air or other operating fluid leaking past the shaft baring, if possible at all, will pass into the space between the piston elements and assist in the operation of the motor. In fact leakage past the bearing may be definitely provided, for the purpose of effecting the direct feeding of the compressed fluid to the space between the piston elements.

The present invention therefore consists in a motor for operation by compressed fluid comprising a casing having a piston chamber, two interconnected piston elements slidable in said chamber, packing means around said piston elements and engaging with the chamber wall to prevent leakage of fluid therepast in the direction from the space between the piston elements to portions of the piston chamber lying outside the said space, a rotatable shaft arranged to extend within the space between the piston elements and coupled thereto so as to be driven thereby with a reciprocating motion, said shaft also extending to a valve chamber adapted for connection to a source of compressed fluid, a slide valve within the valve chamber which is operated by the movement of the shaft to control the flow of compressed fluid from the valve chamber alternately to opposite ends of the piston chamber and simultaneously to exhaust that end of the piston chamber which is not for the time being connected to the valve chamber, a direct connection for feeding compressed fluid to the space between the two piston elements, and means passing through a fluid tight seal for transmitting the movements of said shaft to the outside of the motor casing.

The invention also consists in a motor for operation by compressed fluid comprising a piston chamber having two interconnected piston elements slidable therein and connected to drive a rotatable shaft arranged therebetween with a reciprocating movement, said shaft also passing into a valve chamber which accommodates a semi-rotary automatic valve mechanism for controlling the flow of fluid pressure alternately to opposite sides of the piston elements and the exhausting of that side which is not for the time being connected to the source of compressed fluid, said valve mechanism being actuated by the movement of the rod which changes over the valve with a snap action over-centre motion when a piston element approaches the end of its stroke, and wherein the valve chamber is closed in a fluid tight manner and is connected with the space in the piston chamber between the two piston elements, the shaft passing out of an aperture in the piston chamber or the valve chamber, said aperture being provided with packing means for preventing leakage of fluid pressure therepast.

The piston means may comprise a paddle moving in an arcuate chamber having two paddle leathers arranged with the cupped portions directed towards one another, or may comprise a pair of spaced pistons movable in a cylinder and being interconnected for example by a rack, which cooperates with a pinion to drive the shaft carrying the wiper blade.

A feature of the invention consists in providing the gland or sealing means through which the shaft passes to the outside of the motor casing at a point in the fluid pressure supply line to the slide valve so that any leakage past the gland or sealing means does not affect the operation of the motor to any appreciable extent since the supply of fluid pressure to the valve chamber can always be maintained sufficiently high to compensate for such leakage in the line. This feature may be achieved by a fluid pressure motor comprising two interconnected piston elements wherein the shaft driven by the movement of the piston elements is arranged therebetween and is driven by the piston elements either directly or through gearing, and wherein the shaft passes out of the chamber in which the piston elements are located through one aperture only into a valve chamber which accommodates the automatic slide valve mechanism for controlling the flow of fluid pressure alternately to opposite sides of the piston elements, said shaft passing out of the valve chamber through a gland or other sealing means. Since leakage through the bearing to the space between the two piston elements assists in operating the motor, the only leakage which can occur takes place through the gland or sealing means in the valve chamber through which the shaft passes to the outside of the motor and since the fluid pressure is supplied direct to the valve chamber any leakage past this gland is in fact a leakage in the supply line to the valve ports.

In another embodiment for achieving this result in which the shaft passes out of a gland or sealing means associated with an aperture in the piston chamber, the compressed fluid supply may be fed directly to the space between the two piston elements and from there into the valve chamber.

In order that the invention may be more clearly understood various embodiments thereof will now be described by way of example with reference to the accompanying drawings, in which:

Fig. 1 is a side view partly in section and with the cover of the valve chamber removed of a compressed air motor according to this invention.

Fig. 2 is a section through the motor taken approximately on the line 2—2 of Fig. 1.

Figs. 3a and 3b show front and rear perspective views respectively of the semi-rotary control valve.

Fig. 4 shows a side view of a modified construction of paddle.

Fig. 5 shows a section along the line 5—5 of Fig. 4.

Fig. 6 shows a section through a modified motor construction in which the shaft passes out through a gland in the valve chamber cover.

Fig. 7 shows a side elevation with part of the valve cover cut away of a further alternative construction of compressed air motor according to this invention.

Fig. 8 shows an end view of the motor of Fig. 7.

Fig. 9 shows a section through the motor along the line 9—9 of Fig. 8.

Fig. 10 shows a section through the motor along the line 10—10 in Fig. 7, and

Fig. 11 shows a section through the manual control valve of the motor along the line 11—11 of Fig. 9 looking from below.

Referring to Figs. 1 and 2 of the drawings, the motor casing comprises a body section 1 having an arcuate chamber therein and a cover section 2 sealed thereto by a gasket 3, the casing and cover each constituting half-bearing surfaces of bearings 4 and 4a supporting a shaft 5 to which is secured a vane type of piston 6 which is adapted to oscillate in the motor chamber of the casing in an arcuate manner about the axis of the shaft, angularly oscillating the latter. The piston comprises two interconnected paddle leathers 6a and 6b which are arranged with their cupped surfaces directed inwardly towards one another.

At one side of the casing is arranged a valve chamber 7 which is closed by a cover 8 in an air-tight manner to which chamber the supply of compressed air is fed through the conduit 9. On the part of the cover section 2 of the casing within the valve chamber is a valve seat 10 into which open three valve ports 11, 12 and 13. Ports 11, 12 communicate through passages 14 and 15 respectively to opposite ends of the piston chamber whilst port 13 communicates with an exhaust aperture or passage 16.

Mounted for movement upon and about the axis of the end of the shaft 5 which passes into the valve chamber 7 is an oscillatory valve member 43 (the front and back views of which are shown in perspective in Figs. 3a and 3b respectively) whose face is in sliding contact with the valve seat 10. The valve is actuated by a snap action means being operated by the movement of the shaft 5 to move the valve member 43 to the position shown in Fig. 1 when the piston approaches its operating limit position of clockwise movement and to move the valve to the opposite position when the piston approaches its limit of counter-clockwise movement.

The valve member has upon its valve face a channel 44 which, in the position shown in Fig. 1, opens communication between the ports 12 and 13 whilst port 11 is open to the valve chamber. In the alternative position the channel 44 effects communication between the ports 11 and 13 whilst port 12 is open to the valve chamber.

The snap-action mechanism for operating the valve comprises the kicker 61 which is pivoted to the shaft 5 at the axis of the latter and is engageable by faces 62 of a recess in the end of the shaft. The kicker is engageable with ears 63 on the valve 43 to shift the latter between its two operative positions and its outer end is engaged by a frame 64 which is anchored by a spring 65 to a pressure plate 66 which is mounted over the shaft 5 and a post 67 extending from the adjacent face of the casing 1, the pressure plate bearing against the outer face of the valve member 43. The frame 64, pressure blade 66, kicker 61 and their relation to the valve 43 is similar to that disclosed in Patent No. 1,978,634 granted October 30, 1934, to Henry Hueber.

It will be seen that when the shaft 5 turns angularly counter-clockwise as viewed in Fig. 1 the right shoulder 62 will engage and move kicker 61 until the outer end thereof passes beyond a line extending through the centre of post 67 and the centre of shaft 5, whereupon the spring 65 will snap the kicker counter-clockwise against the left ear 63 of valve 43 and move the latter to its left limit position. Movement of the shaft in the opposite direction, clockwise, will cause the parts to operate in the reverse manner, snapping the valve to the position shown in Fig. 1.

To operate the motor, compressed air is fed to the valve chamber 7 through the conduit 9 and through either port 11 or 12, whichever is uncovered by the valve 43, to one end or the other of the piston chamber. Air will also leak through the bearing 4a where the shaft 5 passes into the valve chamber, directly into the space between the two paddle leathers 6a and 6b, the bearing 4a being provided with grooves 5a or sufficient clearance for this purpose. The opposite end of the piston chamber is at this time connected to the exahust through the channel 44 in the valve 43. The air pressure thus acts between the piston leathers and on one side of the piston to move the piston towards the opposite end of the chamber. When it approaches the opposite end the valve 43 snaps over to feed compressed air to the opposite end of the piston chamber and vent the end to which compressed air was previously supplied, thus reversing the direction of movement of the piston.

In order to prevent leakage through the bearing 4 at the opposite end of the shaft 5, that bearing may be provided with a gland 17 as shown in Fig. 2 or alternatively a leather washer may surround the spindle at the inside of the bearing and be kept against the side of the housing around the spindle by the air pressure and thus prevent leakage. The internal periphery of the washer may be flanged inwards so as to bear firmly against the shaft. The washer may be made integral with the two paddle cup leathers by joining them together adjacent this bearing, for example by making them from one piece of material and forming the washer by a section 6c which joins the two cup leathers together as shown in Fig. 4. Fig. 5 shows a section along line 5—5 in Fig. 4, from which it will be seen that the joining piece 6c is flanged inwards at its centre to prevent leakage around the shaft 5.

The compressed air fed directly to the space between the two paddle leathers 6a and 6b is at the full line pressure and is at a higher pressure than can exist in that part of the piston chamber to which compressed air is being fed through either port 11 and 12, since not only is pressure lost in the long passages 14 and 15 but also, since the paddle is always moving away from that end of the piston chamber to which compressed air is being fed, the pressure therein can never reach the full pressure in the port and passage leading thereto. Thus the full line pressure fed to the space between the paddle leathers can expand them more effectively than the pressure fed to one end of the piston chamber. Furthermore leakage of compressed air from one end of the piston chamber past the paddle to the atmosphere or the other end of the piston chamber cannot take place since, as the air pressure between the paddle leathers is greater than on either side of the paddle, any leaks past the paddle leathers will result in air flowing out from the space between the leathers, so that paddle leaks are taken care of by air flowing through the direct connection to the space between the paddles and not by air flowing through the restricted ports and passages.

Fig. 6 shows a further modification in which the shaft 5 carrying the paddle does not extend through the wall of the housing at the side of the paddle opposite to that at which the valve chamber is located, so that no gland or sealing means is necessary at that side of the paddle, but instead the shaft 5 is extended in the opposite direction, namely through the cover 8 of the valve chamber, which is provided with a bearing fitted with a gland or other sealing means in order to prevent leakage. In the drawings the sealing means is shown as comprising a washer 70 having its internal periphery flanged inwards to embrace the shaft 5, a spring 71 embracing the flange to urge it firmly against the shaft. The washer 70 is retained in position by a plate 72 screwed to the outside of the valve cover 8. The wiper arm is attached to the end of the shaft 5 which projects outside the valve chamber.

A further embodiment of the invention is illustrated in Figs. 7 to 11 of the drawings. In this embodiment the compressed air motor comprises a tubular housing 100, which is conveniently made as a die-casting, having end covers 101. Within the tubular housing, which constitutes a cylinder, are arranged a pair of pistons 102 which are interconnected by a rack element 103. Each piston comprises a cup leather 104, the leathers on the two pistons being inwardly cupped. Springs 105 may be provided for expanding the cup leathers against the wall of the cylinder. The shaft 106 which carries the wiper arm (not shown) is supported by two bearings 107, 108 formed integrally with the casing at opposite sides of the chamber and extending inwardly so as to locate the pinion 109 secured to the shaft 106 in line with the rack 103 and in toothed engagement therewith. One end of the shaft 106 passes out through the casing, leakage of air therepast being prevented by the leather washer 110 which is flanged inwardly at its centre as shown and held in position by the cover plate 111. A spring 112 is provided to urge the flanged portion of the washer firmly against the shaft 106.

The opposite end of the shaft passes into a valve chamber which is sealed by a cover 113 with the interposition of a gasket 114. In this valve chamber is arranged the automatic snap-over valve mechanism which is constructed substantially as described with reference to Fig. 1 (the parts being correspondingly numbered) the only modification being that the kicker 61a is weighted by means of a disc. The central port 13 of the valve face leads to an exhaust aperture 133 in the cover plate 134 which is screwed to the top of the motor housing with the interposition of a gasket 135 in order to prevent leakage from the space in the cylinder between the two cup leathers 104. Beneath the aperture 133 is arranged a piece of felt 115 to act as a silencer. The outer ports 11 and 12 are connected to opposite ends of the cylinder through conduits 116, 117 arranged outside the cylinder chamber and preferably formed in ribs cast integral with the motor housing.

The valve chamber is connected to the space between the two pistons by the aperture 118 and compressed air from any suitable source of supply is directly fed to the space between the piston elements. The compressed air supply is connected to the passage 119 and the starting and stopping and speed control of the motor is effected by a manually operated needle valve 120, air passing the needle valve being fed to the space between the two pistons via the passage 121. The screw down needle valve 120 is provided with a gland 122 for preventing leakage therepast. In order to adjust the maximum pressure obtainable in the motor for different compressed air supplies, and thus preventing the motor from being operated above any predetermined speed, a pre-set valve 123 is provided for restricting the passage 119 (see Fig. 11) and thus the volume of air which can pass the needle valve 120 when it is fully open.

The motor housing 100 has lugs 136 cast integrally therewith for mounting the motor in any desired location.

By feeding the compressed air directly into the space between the two piston elements any leakage at the gland 110 can easily be compensated for by opening the needle valve 120 more fully since it is in effect a leakage in the compressed air line to the valve chamber.

The aperture 118 connecting the space between the pistons to the valve chamber is made smaller than the passage 121, the valve ports being in turn smaller than the passage 118. Thus there is a graded restriction in the air flow to the ends of the cylinder, the flow of air through the ports being sufficient to operate the motor and allow for any leakage past the end covers, the flow of air through the passage 118 being sufficiently large to take care of the air flowing through the ports and any leakage from the valve chamber, and the passage 121 being sufficiently large to allow sufficient air to flow to feed the passage 118 and to allow for any leakage past the piston leathers and through the gland surrounding the shaft.

Although the motors above described are particularly designed for operation by compressed air, it will be appreciated that they may also be operated additionally or alternatively by suction. For example, a source of suction may be connected to the exhaust aperture 133 in the motor illustrated in Figs. 7 to 11, the needle valve in this case controlling the venting of the motor and thus its speed.

Although particular embodiments of the invention have been described by way of example, it will be understood that the invention may be applied to fluid pressure motors operated by fluids other than compressed air, and also that various modifications may be made without departing from the scope of the invention as defined by the appended claims.

I claim:

1. A motor for operation by compressed fluid comprising a casing having a piston chamber, two interconnected piston elements slidable in said chamber and having packing means engaging with the chamber wall to prevent leakage of fluid therepast in the direction from the space between the piston elements to the portions of the piston chamber lying outside the said space, a rotatable shaft arranged to extend within the space between the piston elements and coupled thereto so as to be driven thereby with a back and forth motion, said shaft also extending to an air sealed valve chamber, a valve seat within the valve chamber having an exhaust port and two piston chamber ports, a slide valve on the seat operable by the shaft from one position, in which it uncovers one chamber port to the valve chamber and simultaneously connects the other chamber port to the exhaust port to the exclusion of the valve chamber, to another position in which the order of port connections is reversed, a direct pressure equalizing connection between the valve chamber and the space between the two piston elements, and means passing through a fluid tight seal for transmitting the movements of said shaft to the outside of the motor casing.

2. A motor for operation by compressed fluid comprising a piston chamber having two interconnected piston elements slidable therein and connected to drive a rotatable shaft arranged therebetween with a back and forth movement, said shaft also passing through a bearing into a valve chamber, a valve mechanism including a valve on a seat, the latter having an exhaust port and two piston chamber ports, the valve acting in one position to uncover one chamber port to the valve chamber while simultaneously connecting the other chamber port to the exhaust port to the exclusion of the valve chamber, said valve acting in another position for reversing the port connections, said valve mechanism being actuated by the movement of the shaft which changes over the valve with a snap action over-centre motion when a piston element approaches the end of its stroke, and wherein the valve chamber is closed in a fluid tight manner and is connected in direct fluid communication with the space in the piston chamber between the two piston elements, the shaft passing through a second bearing to the exterior of the motor, and packing means in the second bearing preventing leakage of fluid pressure therepast.

3. A motor for operation by compressed fluid, comprising a piston compartment having two interconnected piston elements slidable therein and connected to drive a rotatable shaft arranged therebetween and partly within the compartment with a back and forth movement, a valve chamber closed in a fluid tight manner arranged at the side of said piston compartment and in direct and constant fluid communication with the space between said piston elements constituting a second chamber, said shaft extending into the valve chamber and passing out of one of the chambers through an aperture provided with packing means for preventing fluid leakage therepast, a valve mounted to rotate upon the portion of the shaft within the valve chamber, snap action means for shifting the valve from one limiting position to another as a piston element reaches the limit of its stroke, three ports in a valve seating associated with said valve and connected to opposite ends of the piston compartment and to an exhaust passage respectively and so arranged that in one position the valve opens a port connected to one end of the piston chamber to the valve compartment and the port connected to the other end of the piston compartment to the exhaust passage, and in the other position of the valve interchanges the connections, and means for connecting a supply of compressed fluid to one of the chambers.

4. A motor as claimed in claim 3, wherein the shaft passes out of the chamber defined by the piston elements through one aperture only into the valve chamber, said shaft passing out of the valve chamber through sealing means.

5. A motor for operation by compressed fluid comprising a cylinder, two pistons arranged in spaced relation within said cylinder and interconnected by a rack member, each piston being provided with a cup-shaped packing washer with the cupped sides of the washers being directed towards one another, a rotatable shaft extending across the cylinder between the two piston elements and carrying a pinion which engages with the rack, one end of said shaft passing out through a first aperture in the wall of the cylinder, the first aperture being provided with packing means for preventing fluid leakage therepast; the other end of said shaft passing through a second aperture in the wall of the cylinder to a valve chamber which is closed in a fluid-tight manner but is in constant fluid communication with the space in the cylinder between the piston elements, a valve seating in said valve chamber provided with ports connected respectively to opposite ends of the cylinder and to an exhaust passage, a slide valve actuated by a snap-action mechanism from the movement of the shaft and co-operating with said ports alternately to connect the fluid pressure in the valve chamber to opposite ends of the cylinder and simultaneously connect the opposite end of the cylinder to the exhaust passage, and means for connecting a supply of compressed fluid to the valve chamber.

6. A motor as claimed in claim 5, wherein the means for connecting the supply of compressed fluid is in direct communication with the space between the two piston elements, the compressed fluid passing to the valve chamber through a passage connecting the valve chamber to the space between the piston elements.

7. A fluid pressure motor as claimed in claim 3, wherein the packing means for preventing fluid leakage past the shaft where it passes out of the piston chamber or cylinder comprises a washer having a central aperture with a flange around its internal periphery which bears firmly against the surface of the shaft.

8. A motor as claimed in claim 3, wherein the piston elements are in the form of paddles movable in an arcuate path and having two packing leathers joined by a bridge piece therebetween constituting the packing means, said bridge piece having an aperture through which the shaft passes.

WILLIAM EDWARD O'SHEI.